Aug. 15, 1933.  M. K. McCOSH  1,922,552
VEHICLE JACK
Filed April 23, 1931  2 Sheets-Sheet 1
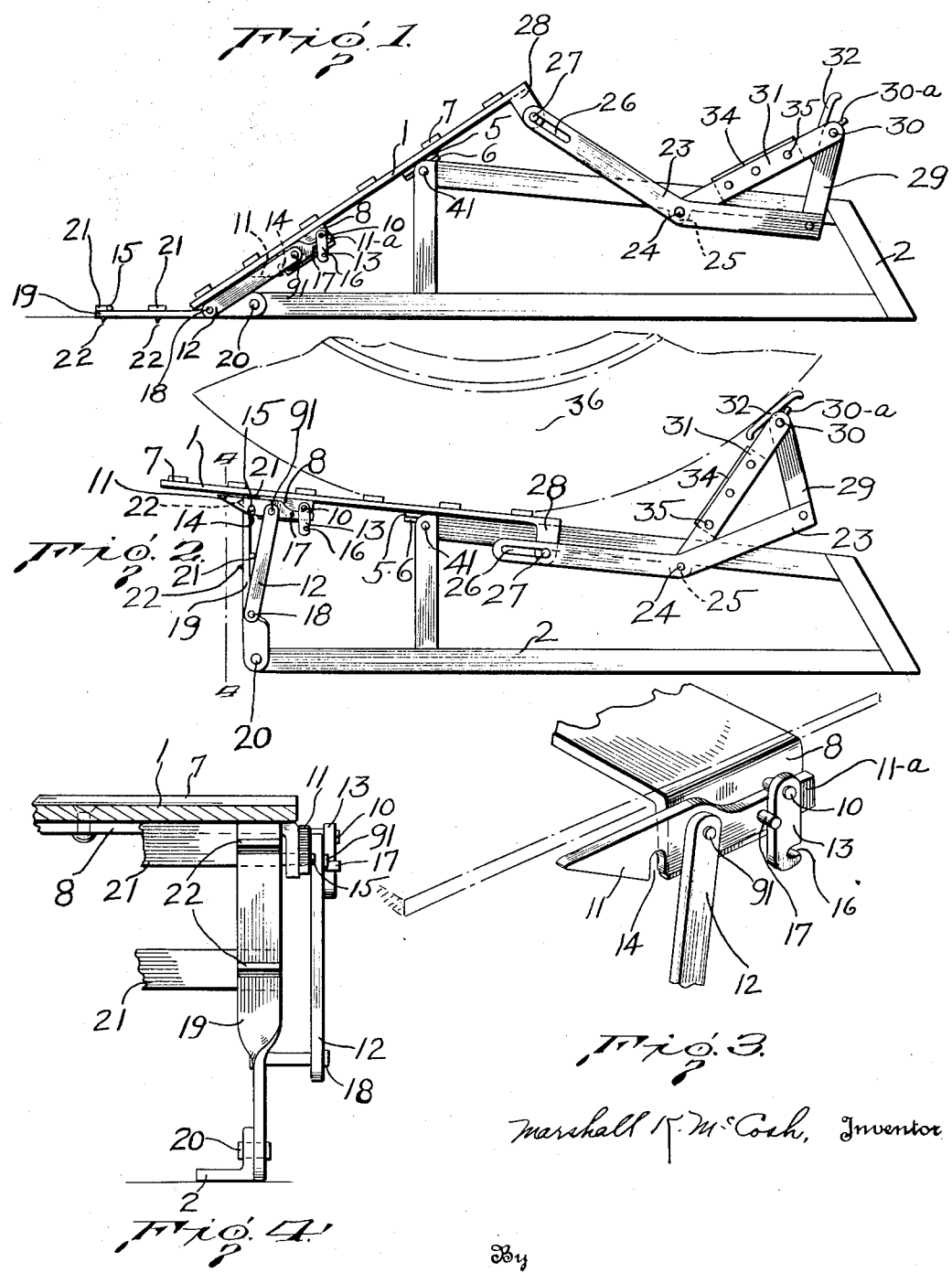

Aug. 15, 1933.     M. K. McCOSH     1,922,552
VEHICLE JACK
Filed April 23, 1931     2 Sheets-Sheet 2
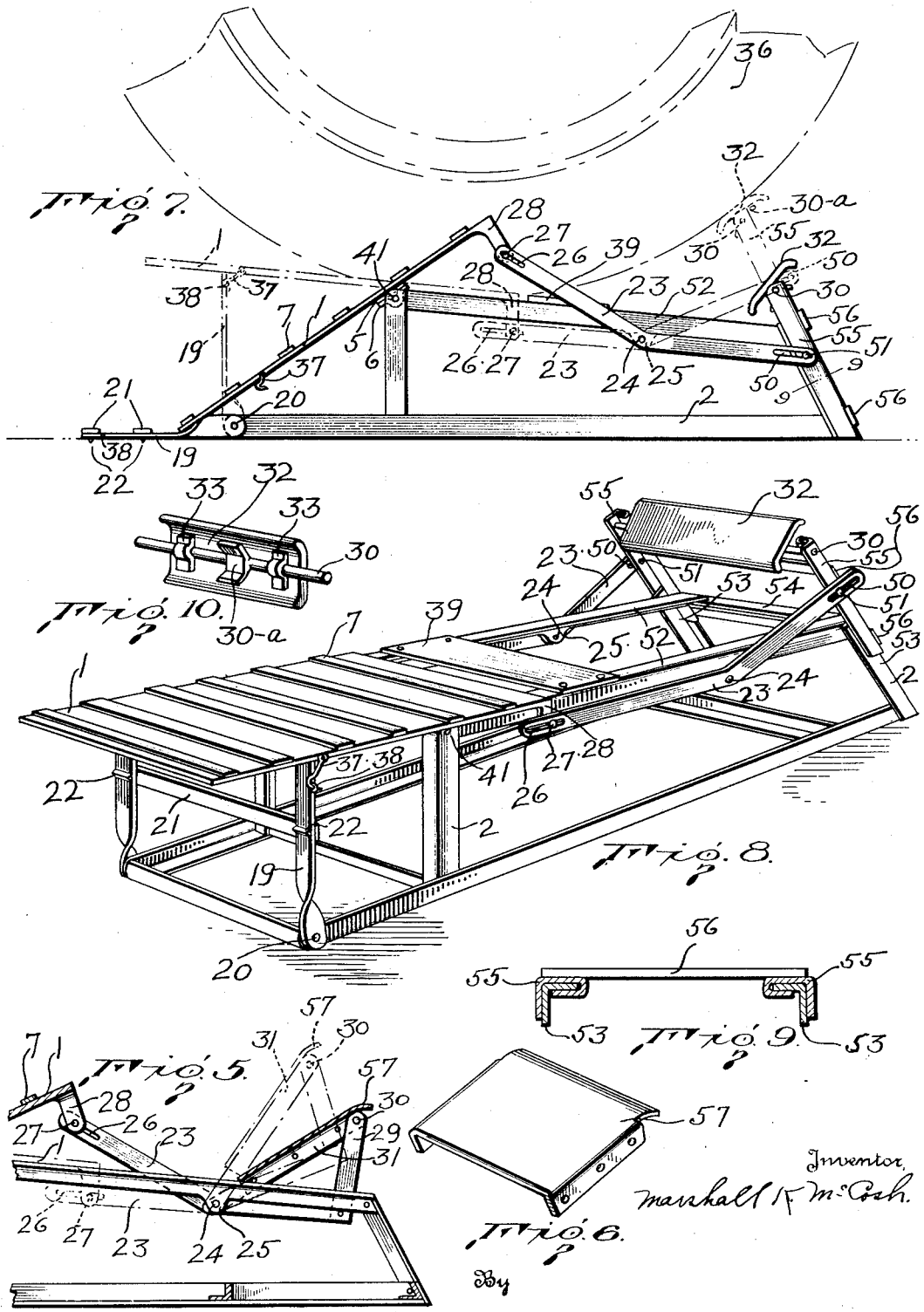

Patented Aug. 15, 1933

1,922,552

UNITED STATES PATENT OFFICE 1,922,552

VEHICLE JACK

Marshall K. McCosh, Reisterstown, Md.

Application April 23, 1931. Serial No. 532,342

7 Claims. (Cl. 254—88)

These inventions relate to vehicle jacks and have special reference to a vehicle jack on which a wheel of a vehicle is run to elevate said wheel and the portion of the vehicle associated therewith.

The objects and nature of the inventions will be readily understood by those skilled in the art in the light of the following explanation and the accompanying drawings illustrating what now appears to be the preferred mechanical expression or embodiment of my inventions from among other forms, constructions and arrangements within the spirit and scope thereof.

It happens in the case of a number of vehicles that parts of the vehicle interfere with the positioning of a jack of this type in front of or behind a wheel of said vehicle, or with the operation of the jack, that is; the wheel-stop in its elevated position is often in the way, encountering some part or parts of the said vehicle either when an effort is made to position the jack to receive said wheel or when said wheel moves on the jack. To overcome this difficulty is one of the objects of these inventions, and a movable-stop arrangement by virtue of which a stop-plate is in its functioning position only when it is needed to function as a stop and will not encounter any part of the vehicle has been provided.

Another object of the inventions is to provide a movable-platform holding arrangement by virtue of which the said platform automatically will be held and supported in the position it assumes when a vehicle wheel has moved approximately the maximum distance upon said jack, and held until it is desired that said platform shall again be free to move.

Another object of the inventions is to provide a locking arrangement by virtue of which the movable stop, said movable-platform holding arrangement, and the platform-holder will be locked automatically in their respective positions when a vehicle wheel has moved approximately the maximum distance upon said jack.

Although the platform is inclined downwardly towards the stop-plate end of the jack when the vehicle wheel has moved approximately the maximum distance upon said jack and comes to rest thereon, and although this inclined position of the platform normally prevents movement of said wheel towards the floor-plate end of said jack, it is, nevertheless, a safety precaution to have the platform securely held, supported and locked in said inclined position. To accomplish this automatically is, as stated above, one object of these inventions.

It is also an object of these inventions to permit easy unlocking of said platform-holder, movable stop, and their actuating arrangements so that they will be free to move again when desired. To accomplish this object arrangements have been provided as herein described.

Another object of the inventions is to increase the resistance to sliding motion of the floor-plate on the jack-supporting surface.

With these and other ends in view, my inventions consist of certain novel features, arrangements and combinations as more fully and specifically set forth hereinafter, illustrated in the accompanying drawings, and particularly pointed out in the claims.

In the accompanying drawings—

Figure 1 is a side elevation of what seems to me now to be the preferred embodiment of my inventions. It shows the disposition of the parts prior to a vehicle wheel being moved upon it.

Figure 2 is a side elevation of the embodiment shown in Figure 1, showing the disposition of the parts when a vehicle wheel has been moved the maximum distance upon it.

Figure 3 is a detail perspective of the locking and unlocking devices.

Figure 4 is a section on the line 4—4 of Figure 2.

Figure 5 is a longitudinal section of another embodiment of my invention of movable stop.

Figure 6 is a detail perspective of a part of the stop-plate shown in Figure 5.

Figure 7 is a side elevation of another embodiment of my invention of movable stop. The full-line showing of the movable parts is the disposition of those parts prior to a vehicle wheel being moved upon the jack; and the dotted-line showing is the disposition of those parts when a vehicle wheel has been moved the maximum distance upon it.

Figure 8 is a perspective view of the embodiment shown in Figure 7, and shows same in the dotted-line position of Figure 7.

Figure 9 is a section through the sliding members and the angle-iron lengths about which they are folded at the forward end of the embodiment shown in Figures 7 and 8.

Figure 10 is a detail perspective of the self-adjusting stop shown in Figures 1, 2, 7, and 8.

In the embodiment shown in Figures 1 and 2 a steel-plate platform 1 is pivoted on a shaft 41 which is fixed in the jack body 2 at the position shown and which extends across the width of the jack body. The jack body is constructed of lengths of angle iron bolted, riveted or welded at their junctions. A strip 5 is welded to the under side of the platform 1, and to this strip the rod 41 is fastened by a metal strap-bearing 6 welded to the strip 5. Cleats 7 are welded to the platform 1 to increase the traction of a vehicle wheel moving on the platform. A steel plate 8 extends across the width of the platform 1 and is riveted to the underside of the platform: the ends of the strip are bent downward at right-angles as shown in Figure 3. In the turned-downward portions of this strip 8 are holes in which are fixed pivots 91 and 10. On pivot 91 is pivoted the latch 11 and the arm 12; and on the pivot 10 is pivoted the small latch 13. The slot 14 of latch 11 locks over pin 15 as shown in Figure 2; and when it is desired to unlock pin 15, the slot end of latch 11 is raised by locking the slot 16 of the small latch 13 over pin 17. The rear portion 11—a of latch 11 is lighter in weight than the portion on the other side of the pivot 91, and the upper edge of the rear portion 11—a normally rests against the under side of the pivot 10 when the small latch 13 is not locked over pin 17. Arm 12 is pivoted also by pivot 18 to the floor-plate 19, floor-plate 19 being pivoted to the jack body 2 by the pivot 20. These pivots have heads to hold the pivoted members in place thereon. Braces 21 extend the width of the floor-plate 19 and act as traction-increasing members for a vehicle wheel and also add rigidity to the floor-plate. Prongs 22 are welded to the under side of the floor-plate 19 to increase its resistance to sliding on the jack-supporting surface.

In the embodiment shown in Figures 1 and 2 a steel arm 23 has fixed in it, in the position shown, a pivot 24 which turns in the small steel plate 25 which is welded to the jack body 2 and projects downward therefrom. At the front end of arm 23 is a slot 26 in which is a pin 27 having a head on it, which pin 27 is fixed in a small steel plate 28. Steel plate 28 is welded to the platform 1. At the rear end of steel arm 23 bar 29 is riveted thereto and extends upwardly therefrom, being joined at rod 30 by bar 31. Rod 30 extends through round holes in bars 29 and 31 and is rigidly fixed thereto. Bar 31 has a round hole in the other end also, through which hole runs pivot 24. Bar 31 and arm 23 are welded together at pivot 24. Rod 30 extends the width of the jack, and on it is placed the stop-plate 32 shown in rear-view perspective in Figure 10. As shown in Figure 10, the stop-plate 32 is held on the rod 30 by steel strap-bearings 33. Rod 30 cannot turn, but stop-plate 32 can turn on rod 30 in either direction until the stop-plate strikes either the upper or lower end of limit 30—a which is rigidly fastened to rod 30 by welding. Plate 34 serves the purpose of adding rigidity to the movable stop asembly. The plate 34 extends across the width of the jack, both ends of the plate being bent ninety degrees and riveted to the inner sides of the bars 31 with rivets 35.

The assembly consisting of arm 23, bar 29, rod 30, bar 31, steel plate 34 and rivets 35 constitutes one embodiment of what I term a movable stop. The assembly consisting of rod 30, stop-plate 32, stops 30—a and strap-bearings 33 constitutes one embodiment of what I term a self-adjusting stop.

36 represents an automobile tire in Figures 2 and 7, the tire and the vehicle wheel, of which the tire is a part, having been moved the maximum distance upon the jack in the case of each of the Figures 2 and 7.

The side elevations of the other side of this embodiment are the same in all details as the side elevations shown in Figures 1 and 2.

In Figures 7 and 8, which show another embodiment of my invention of a movable stop, a hand-latch 37 is latched in an eye-head pin 38 when they are in the dotted-line positions of Figure 7, which are the positions shown in Figure 8. A steel plate 39 serves to stiffen the jack body 2 and also serves as an extension to platform 1, when the platform is in the position of Figure 8, which extension is sometimes needed when the jack is used for small-diameter wheels, as such wheels move farther on the platform before coming in contact with the stop-plate 32. In this embodiment the movable stop arm 23 has a slot 50 at its rear end, in which slot 50 is pin 51 having a head on it. The angle-iron lengths 52 of the jack body do not extend quite to the rear of the inside of the angle-iron lengths 53 of the jack body. Nor does the angle-iron cross-member 54 quite touch the rear of the inside of the angle-iron lengths 53. Thus space is left for the sliding movement, in an approximately up-and-down direction, of sliding-members 55, which sliding-members are formed to fold about the rear side of angle-iron lengths 53 as shown in detail in Figure 9. Ball bearings or other means of decreasing friction may be made use of in connection with these sliding-members. The sliding-members 55 are held in constant relative position with respect to each other by cross bars 56 and rod 30 which are fastened to the sliding-members by welding, riveting or bolting. The self-adjusting stop shown in Figure 10 is used in this embodiment also.

The side elevation of the other side of the embodiment shown in Figures 7 and 8 is the same in all details as the side elevation shown in Figure 7.

In Figure 7 the assembly consisting of arm 23, sliding-member 55, rod 30, cross bars 56, and pin 51 constitutes one embodiment of what I term a movable stop.

Figure 5 shows another embodiment of my invention of a movable stop. In this embodiment a stop-plate 57 is riveted to arms 31 as in the case of steel plate 34 in Figures 1 and 2, except that stop-plate 57 extends a little beyond the end of arms 31 at rod 30 and is curved downward at the end nearer to rod 30.

Some of my inventions which are shown and described but not claimed in this application are claimed in my applications for patents, Serial numbers 487,018, filed October 7, 1930, 500,228, filed December 5, 1930, and 515,453 filed February 13, 1931.

The jack is used in the following described manner.—

With the parts disposed as shown in Figure 1, the jack is positioned immediately in front of or behind a vehicle wheel or tire where it rests on the ground. The vehicle is then moved to run onto the floor-plate 19, which its weight pins to the jack-supporting surface, and up the platform 1. Under the weight of the moving wheel the upper or forward end of the platform drops to the position shown in Figure 2. As the upper or forward end of the platform drops the movable stop arrangement is actuated thereby and the stop-plate 32 is moved to the position shown in Figure 2. As the upper or forward end of the platform drops the combined floor-plate and platform-holder arrangement, also, is actuated thereby until it is raised to the vertical position shown in Figure 2. As the combined floor-plate and platform-holder 19 nears the vertical position pin 15 raises the front end of latch 11 until it comes under slot 14, when the latch falls and the top of slot 14 rests on pin 15, locking it and, thereby, the entire combined floor-plate and platform-holder arrangement. When this arrangement is in this vertical position it also holds and supports the platform 1, locking also thereby the entire movable stop arrangement.

When it is desired to run the vehicle wheel off the jack and return it to the jack-supporting surface, the small latch 13 is locked over the pin 17 and the front end of the latch 11 is thereby raised so that pin 15 is free of slot 14, leaving the combined floor-plate and platform-holder arrangement, the platform 1 and the entire movable stop arrangement unlocked and free to be actuated again by upward movement of the upper or forward end of the platform 1 as the wheel is moved off the jack.

The small latch 13 should be unlocked before a wheel is again run up the platform 1, so that the latch 11 will be free to operate again and automatically lock the combined floor-plate and platform-holder, the platform, and movable stop, and their actuating arrangements, at the proper time.

In the case of the embodiment of my invention of a movable stop shown in Figure 7 the full lines show the position of the parts before a wheel is moved upon the jack, and the dotted lines show the position when a wheel has moved the maximum distance upon it. When a wheel has moved the maximum distance upon the jack as shown by the position of tire 36 the combined floor-plate and platform-holder as shown in this Figure 7 is swung upwards by hand on its pivots 20 to the vertical position shown by the dotted lines, and the latch 37 is latched in the opening 38. Before the combined floor-plate and platform-holder 19 is moved to its vertical position the movable stop is virtually locked by the weight of the wheel together with the position of the wheel relative to the parts, as the wheel normally cannot move farther forward than the stop-plate 32 and rearward movement of the wheel withdraws it from that position. The perspective shown in Figure 8 shows the positions shown by the dotted lines in Figure 7.

As is evident, various changes, modifications and variations may be resorted to without departing from the spirit and scope of my inventions and, therefore, I do not wish to limit my inventions to the exact disclosures hereof.

What I claim is:

1. A vehicle jack comprising a body, an inclined platform leading to the top of said body, a stop movably mounted on said body, and means actuated by a vehicle wheel for moving said stop into position to stop the forward movement of said wheel by direct contact with said wheel when said wheel has moved approximately the maximum distance upon said body and for moving said stop from that position when said wheel moves toward the rear end of said inclined platform.

2. A vehicle jack comprising a body, an inclined platform leading to the top of said body, a stop movably mounted on said body, and means actuated by a vehicle wheel for moving said stop into position to stop the forward movement of said wheel by direct contact with said wheel when said wheel has moved approximately the maximum distance upon said body.

3. A vehicle jack comprising a body, a platform reaching to the top of said body, and a wheel stop-plate movably mounted on said body, and means adapted to move said stop-plate upward to a position to stop the forward movement of a vehicle wheel when said wheel moves forwardly on said platform, said means being actuated by said wheel in its said movement forwardly on said platform.

4. A vehicle jack as set forth in claim 3, the stop-plate of said vehicle jack being pivotally mounted on means whereby said stop-plate adjusts itself to the tread of a wheel by turning on said means when said wheel comes in contact with said stop-plate, the said means being mounted on the body of the said jack.

5. A vehicle jack comprising a body, a platform reaching to the top of said body, a stop movably mounted on said body, means mounted on said body and adapted to move said stop relative to said means into, and locking it in, a position to stop a vehicle wheel when said wheel has moved on to the said body, said means being actuated by said wheel.

6. A vehicle wheel stop-plate movably mounted on a support, means connecting said stop-plate with other means, said other means movably mounted on said support and adapted to be actuated by a vehicle wheel as said wheel moves forwardly toward said stop-plate and to move said stop-plate upwardly to a position to stop the forward movement of said wheel by direct contact with said wheel.

7. A vehicle jack comprising a body, a platform reaching to the top of said body, a stop movably mounted on said body, means mounted on said body and adapted to move said stop relative to said means into a position to stop a vehicle wheel when said wheel has moved on to said body, said means being actuated by said wheel.

MARSHALL K. McCOSH.